US012413000B2

(12) United States Patent
Ikeda

(10) Patent No.: US 12,413,000 B2
(45) Date of Patent: Sep. 9, 2025

(54) FLAT CONDUCTOR ELECTRIC CONNECTOR

(71) Applicant: HIROSE ELECTRIC CO., LTD., Kanagawa (JP)

(72) Inventor: Ryota Ikeda, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 323 days.

(21) Appl. No.: 18/319,278

(22) Filed: May 17, 2023

(65) Prior Publication Data

US 2023/0378672 A1 Nov. 23, 2023

(30) Foreign Application Priority Data

May 19, 2022 (JP) ................................ 2022-082144

(51) Int. Cl.

*H01R 12/00* (2006.01)
*H01R 12/70* (2011.01)
*H01R 12/72* (2011.01)
*H01R 13/627* (2006.01)

(52) U.S. Cl.

CPC ....... *H01R 12/7058* (2013.01); *H01R 12/727* (2013.01); *H01R 13/6272* (2013.01)

(58) Field of Classification Search

CPC .......................... H01R 12/727; H01R 12/7058
See application file for complete search history.

(56) References Cited

U.S. PATENT DOCUMENTS 9,876,297 B2 * 1/2018 Takane ................. H01R 13/635
10,566,721 B2 * 2/2020 Nakajima .............. H01R 12/89
2006/0178039 A1 * 8/2006 Chen ...................... H01R 43/20 439/495
2017/0170585 A1 * 6/2017 Yukutake ............ H01R 12/721
(Continued)

FOREIGN PATENT DOCUMENTS

CN 109075483 A 12/2018
CN 109997281 A 7/2019
JP 2019-67717 A 4/2019

OTHER PUBLICATIONS

Taiwanese Office Action (TWOA) issued on Jun. 10, 2025 for Taiwanese Patent Application No. 112115973 and its English machine translation.

*Primary Examiner* — Phuong Chi Thi Nguyen
(74) *Attorney, Agent, or Firm* — RANKIN, HILL & CLARK LLP

(57) ABSTRACT

A flat conductor electric connector includes: a housing with a receiving space open to a back such that the flat conductor is inserted forward into the housing; and multiple terminals arrayed and held on the housing with plate surfaces of the terminals at right angle to a terminal array direction, wherein each terminal has an arm portion with a support target arm portion on an inner surface of a wall portion extending in a front-back direction, and with an arm portion having a first portion extending from a back end of the support target arm portion and elastically displaceable in a thickness direction of the flat conductor, and a second portion, on a receiving space side from the first elastic portion, being bent forward from a back end of the first portion, being elastically displaceable in the thickness direction, and having a contact portion contactable with the flat conductor.

4 Claims, 8 Drawing Sheets

(56) References Cited

U.S. PATENT DOCUMENTS

| | | | | |
|---|---|---|---|---|
| 2019/0044263 | A1* | 2/2019 | Manba .................. | H01R 12/88 |
| 2019/0190167 | A1 | 6/2019 | Choi et al. | |
| 2020/0251842 | A1 | 8/2020 | Takane et al. | |
| 2021/0359449 | A1 | 11/2021 | Manba | |

* cited by examiner

FLAT CONDUCTOR ELECTRIC CONNECTOR

CROSS-REFERENCE TO RELATED APPLICATION

This application claims priority from Japanese Patent Application No. 2022-082144 filed with the Japan Patent Office on May 19, 2022, the entire content of which is hereby incorporated by reference.

BACKGROUND

1. Technical Field

The present disclosure relates to a flat conductor electric connector to which a flat conductor is connected.

2. Related Art

A connector to which a band-shaped flat conductor extending in a front-back direction and having a thickness in an up-down direction is insertably connected forward is disclosed in JP-A-2019-067717. JP-A-2019-067717 describes a backward direction as a flat conductor insertion direction and describes a forward direction as a flat conductor removal direction, but the forward direction will be described herein as the flat conductor insertion direction and the backward direction will be described herein as the flat conductor removal direction. The connector of JP-A-2019-067717 is mounted on a mount surface of a circuit board, and multiple terminals arrayed with a flat conductor band width direction as a terminal array direction are held on a housing. Moreover, a lock member for preventing detachment of a flat conductor is turnably supported by the housing.

The terminal is formed in such a manner that a metal plate member is punched into a flat plate shape, and is provided in such a posture that a plate surface thereof is at a right angle to the terminal array direction. The terminal has two contact pieces extending backward along a lower wall of the housing and elastically displaceable in the up-down direction, and at a contact provided at a back end of each contact piece, contacts the flat conductor from below.

SUMMARY

A flat conductor electric connector according to an embodiment of the present disclosure is a flat conductor electric connector to which a flat conductor extending in a front-back direction is connected, including: a housing formed with a receiving space which is opened to a back such that the flat conductor is inserted forward into the housing; and multiple terminals arrayed and held on the housing in a state in which plate surfaces of the terminals are at a right angle to a terminal array direction which is a direction at a right angle to both the front-back direction and a thickness direction of the flat conductor, in which each terminal has an arm portion extending in the front-back direction, the arm portion has a support target arm portion supported on an inner surface of a wall portion and extending in the front-back direction, and an elastic arm portion extending backward from the support target arm portion, the elastic arm portion has a first elastic portion extending from a back end of the support target arm portion and elastically displaceable in the thickness direction of the flat conductor without the support target arm portion supported on the wall portion, and a second elastic portion positioned on a receiving space side with respect to the first elastic portion, bent forward from a back end of the first elastic portion, and elastically displaceable in the thickness direction of the flat conductor, and the second elastic portion has a contact portion contactable with the flat conductor with contact pressure.

DETAILED DESCRIPTION

Figure 1:
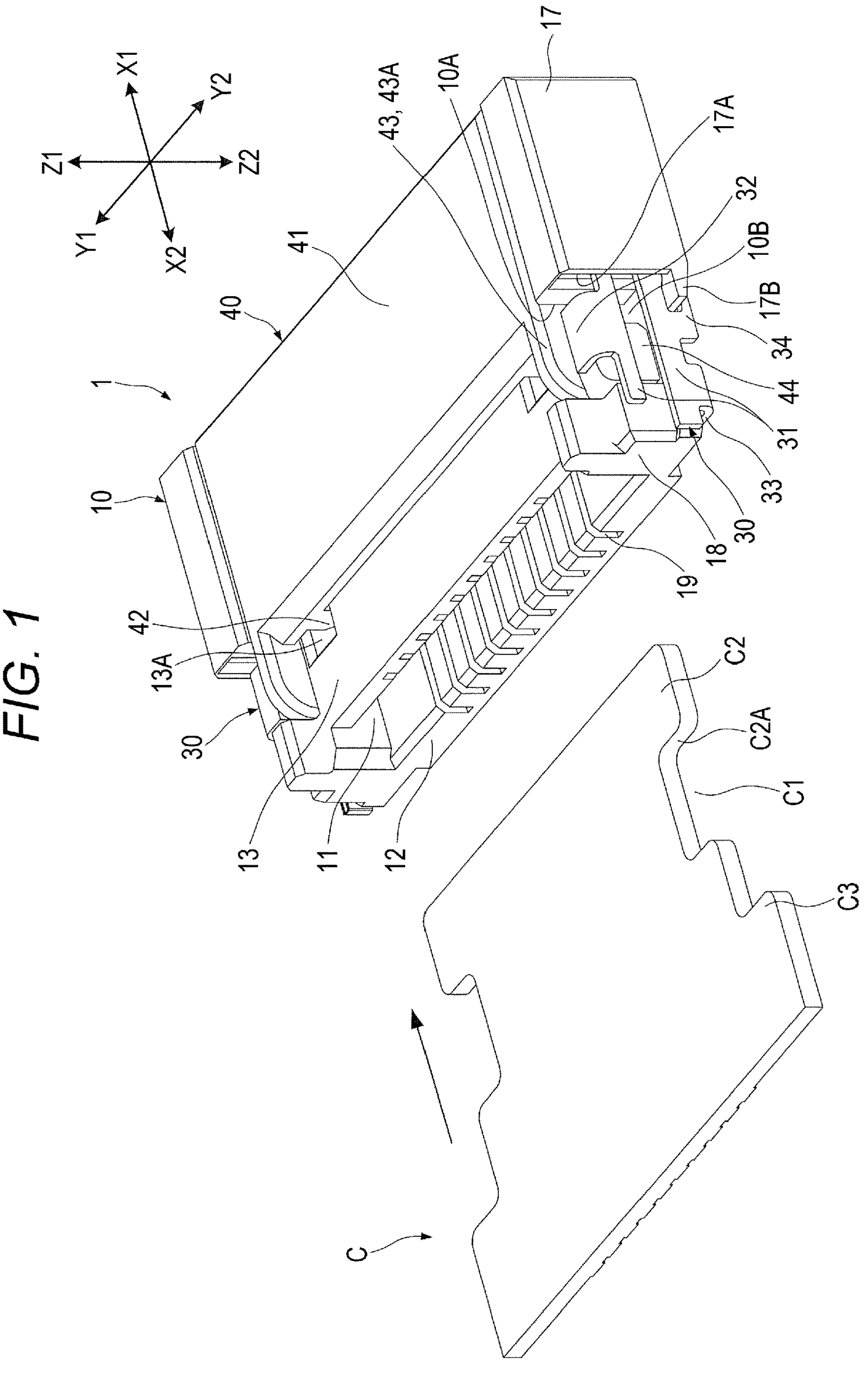
FIG. 1 is a perspective view showing, together with a flat conductor, a flat conductor electric connector according to an embodiment of the present invention, and shows a state immediately before the flat conductor is connected.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In JP-A-2019-067717, the contact piece of the terminal extends backward, and the contact is provided at the back end of the contact piece. Thus, there is a probability that the contact piece is buckled due to collision of a front end of the flat conductor with the contact of the contact piece from the back upon insertion connection of the flat conductor. Due to buckling of the contact piece, the contact piece and the flat conductor cannot properly contact each other.

The present invention has been made in view of the above-described situation, and is intended to provide a flat conductor electric connector configured such that buckling of a terminal when a flat conductor is inserted into and connected to the connector can be avoided and the terminal and the flat conductor can properly contact each other.

(1) A flat conductor electric connector according to the present invention is a flat conductor electric connector to which a flat conductor extending in a front-back direction is connected, including: a housing formed with a receiving space which is opened to a back such that the flat conductor is inserted forward into the housing; and multiple terminals arrayed and held on the housing in a state in which plate surfaces of the terminals are at a right angle to a terminal array direction which is a direction at a right angle to both the front-back direction and a thickness direction of the flat conductor.

In the flat conductor electric connector, in the present invention, each terminal has an arm portion extending in the front-back direction, the arm portion has a support target arm portion supported on an inner surface of a wall portion and extending in the front-back direction, and an elastic arm portion extending backward from the support target arm portion, the elastic arm portion has a first elastic portion extending from a back end of the support target arm portion and elastically displaceable in the thickness direction of the flat conductor without the support target arm portion supported on the wall portion, and a second elastic portion positioned on a receiving space side with respect to the first elastic portion, bent forward from a back end of the first elastic portion, and elastically displaceable in the thickness direction of the flat conductor, and the second elastic portion has a contact portion contactable with the flat conductor with contact pressure.

In the present invention, the second elastic portion of the terminal having the contact portion is bent at the back end of the first elastic portion, and extends forward. Thus, when the flat conductor is inserted into the receiving space of the housing from the back, the flat conductor is smoothly guided forward by back end portions of the terminals, i.e., bent portions of the elastic arm portions curved in a backwardly-raised shape, and reaches the position of the contact portions of the second elastic portions. As a result, at any portion, the terminal is not buckled due to contact with a front end of the flat conductor. Thus, proper contact pressure between the terminals and the flat conductor can be easily ensured.

(2) In the aspect (1) of the invention, the first elastic portion may be formed thicker and longer than the second elastic portion as viewed in the terminal array direction, and a front end of the first elastic portion may be positioned at a front with respect to a front end of the second elastic portion.

Generally, in order to avoid concentration of a load on part of the elastic arm portion due to contact with the flat conductor in a case where the elastic arm portion for contact with the flat conductor is provided at the terminal, a portion of the elastic arm portion on a free end side is formed thin, and the opposite portion thereof is formed thick in many cases. With this configuration, stress on the elastic arm portion is dispersed. In the aspect (2) of the invention, in the elastic arm portion, the first elastic portion is formed thicker, and the second elastic portion positioned on the free end side is formed thinner than the first elastic portion. With this configuration, the stress is dispersed. If the thick first elastic portion and the thin second elastic portion are formed with the same length, it is difficult to ensure proper contact pressure due to a great difference in spring properties between both these elastic portions when the contact portion of the second elastic portion contacts the flat conductor. On the other hand, in the aspect (2) of the invention, the first elastic portion thicker than the second elastic portion is formed longer, and therefore, the spring properties can be set to a similar degree between the first elastic portion and the second elastic portion, and as a result, a proper pressure of contact with the flat conductor is easily ensured.

(3) In the aspect (1) or (2) of the invention, each terminal may have another arm portion positioned on the opposite side of the receiving space from the arm portion and extending in the front-back direction, the other arm portion may have another contact portion contacting the flat conductor with contact pressure to sandwich the flat conductor in cooperation with the contact portion, and a distance between the contact portion and the other contact portion in the front-back direction may be smaller than the thickness dimension of the flat conductor.

Since the distance between the contact portion and the other contact portion in the front-back direction is set smaller than the thickness dimension of the flat conductor as described above, even when the flat conductor tilts due to external force applied in the thickness direction of the flat conductor in a state in which the flat conductor is connected to the connector, a state in which the flat conductor is sandwiched by the contact portion and the other contact portion is easily maintained. As a result, contact between the flat conductor and each terminal with proper contact pressure can be ensured, and unexpected detachment of the flat conductor can be avoided.

(4) In the aspect (1) or (2) of the invention, each terminal may have another arm portion positioned on the opposite side of the receiving space from the arm portion and extending in the front-back direction, the other arm portion may have another contact portion contacting the flat conductor with contact pressure to sandwich the flat conductor in cooperation with the contact portion, and a distance between the contact portion and the other contact portion in the front-back direction may be smaller than twice as great as a clearance dimension between the contact portion and the other contact portion in the thickness direction of the flat conductor.

Generally, in a case where the flat conductor is sandwiched by the contact portion and the other contact portion, the clearance dimension between the contact portion and the other contact portion in the thickness direction of the flat conductor is often set smaller than the half of the thickness dimension of the flat conductor in order to ensure sufficient contact pressure for the flat conductor. Thus, the distance between the contact portion and the other contact portion in the front-back direction is set smaller than twice as great as the above-described clearance dimension. With this configuration, even when the flat conductor tilts due to the external force applied in the thickness direction of the flat conductor in the state in which the flat conductor is connected to the connector, the state in which the flat conductor is sandwiched by the contact portion and the other contact portion is easily maintained. As a result, contact between the flat conductor and each terminal with proper contact pressure can be ensured, and unexpected detachment of the flat conductor can be avoided.

In the present invention, buckling of the terminal when the flat conductor is inserted into and connected to the connector can be avoided, and the terminal and the flat conductor can properly contact each other.

Hereinafter, an embodiment of the present invention will be described based on the attached drawings.

Figure 2:
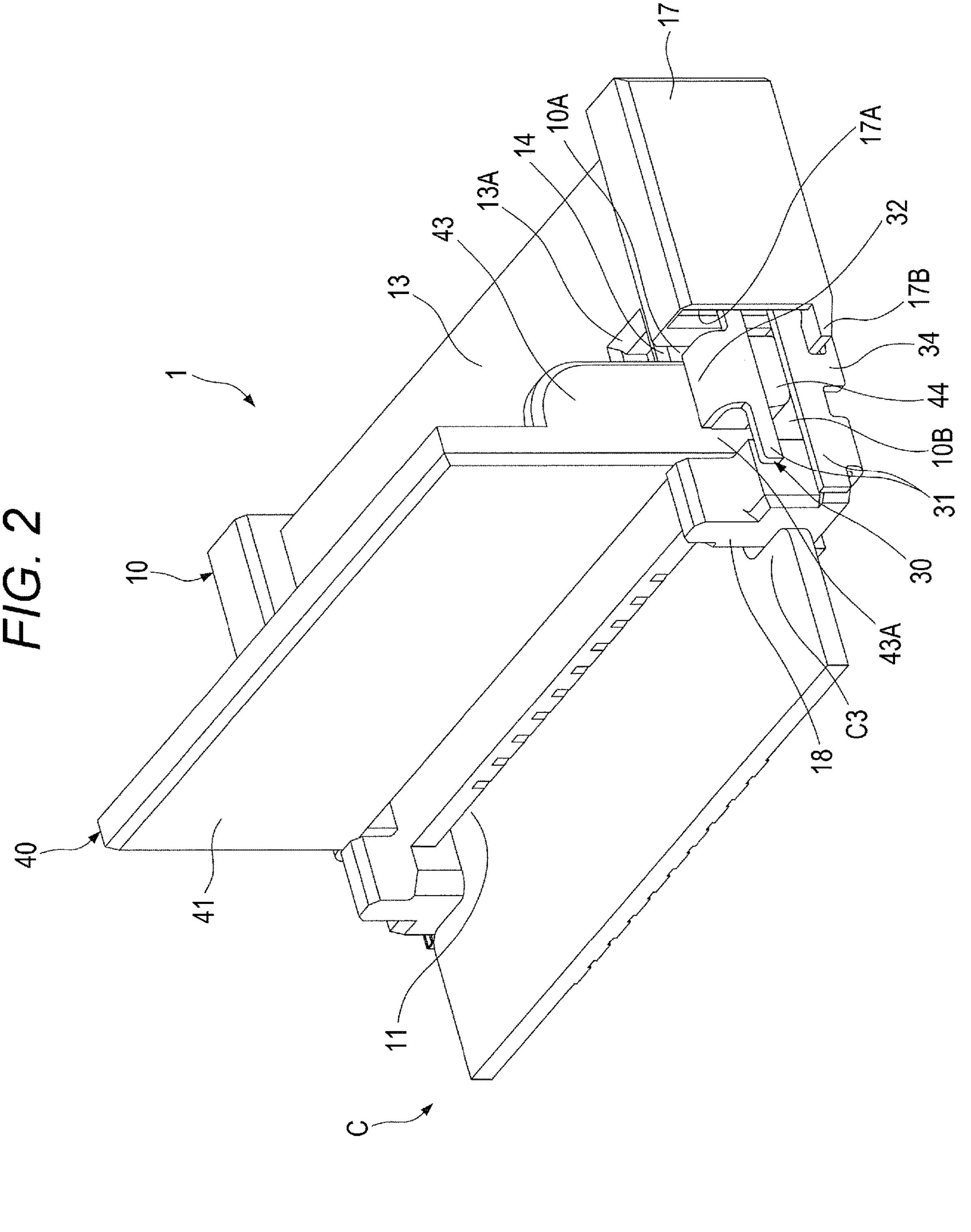
FIG. 2 is a perspective view showing, together with the flat conductor, the flat conductor electric connector according to the embodiment of the present invention, and shows a state immediately before the flat conductor is removed.
Figure 3:
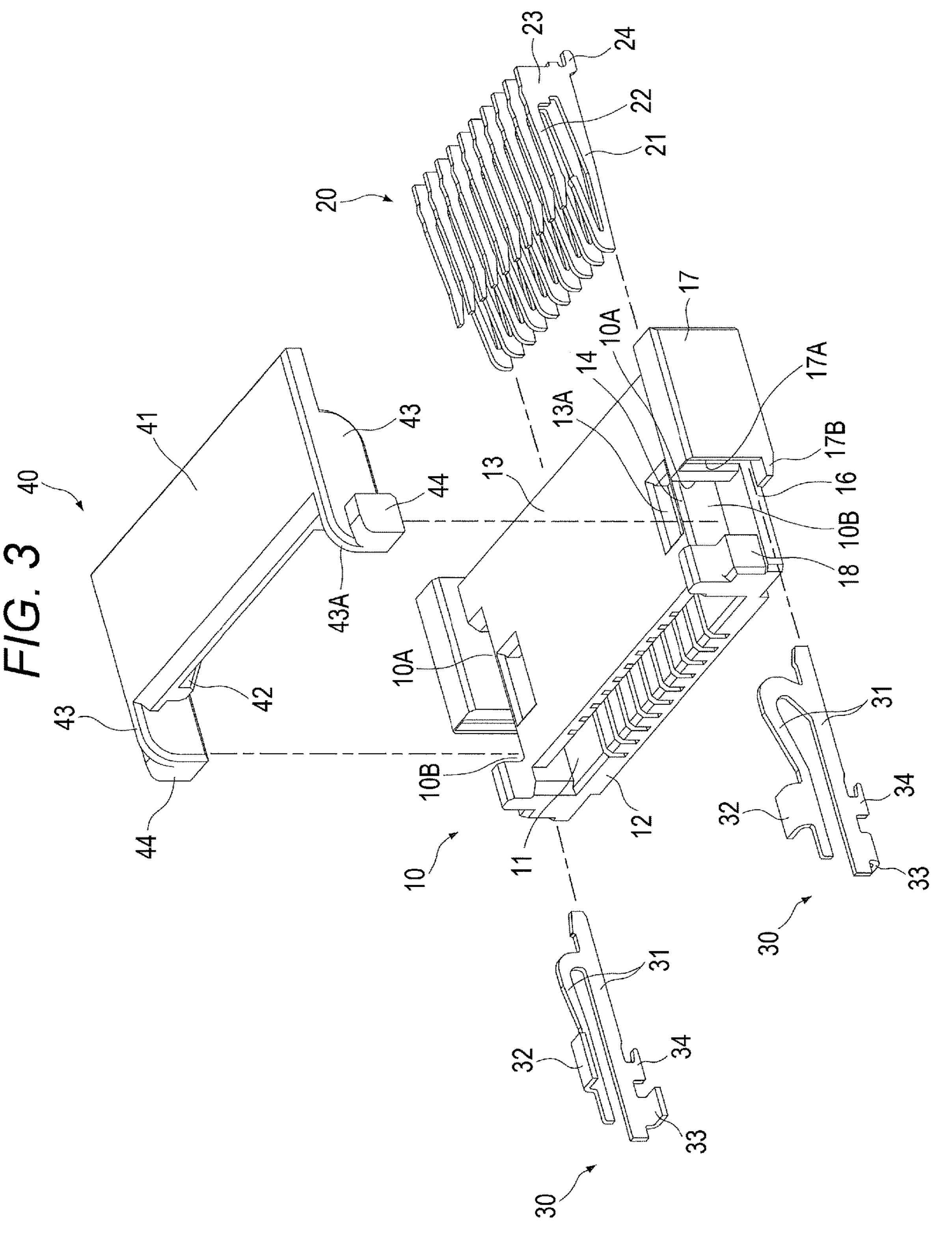
FIG. 3 is a perspective view showing a state in which terminals, metal fittings, and a movable member are disassembled from the flat conductor electric connector.

FIGS. 1 and 2 are perspective views showing, together with a flat conductor C, a flat conductor electric connector 1 (hereinafter referred to as a "connector 1") according to the present embodiment, FIG. 1 showing a state immediately before the flat conductor C is connected and FIG. 2 showing a state immediately before the flat conductor C is removed. FIG. 3 is a perspective view showing the connector 1 with terminals 20, metal fittings 30, and a movable member 40 disassembled from the connector 1.

The connector 1 is mounted on a mount surface of a circuit board (not shown), and the flat conductor C (e.g., an FPC) which is a partner connector is connected so as to be insertable into or removable from the connector 1 with a front-back direction (X-axis direction) parallel with the mount surface as an insertion-removal direction. The connector 1 brings the circuit board and the flat conductor C into electrical conduction with each other in such a manner that the flat conductor C is connected to the connector 1. In the present embodiment, in the X-axis direction (front-back direction), an X1 direction is a forward direction, and an X2 direction is a backward direction. Moreover, a Y-axis direction at a right angle to the front-back direction (X-axis direction) is a connector width direction, and a Z-axis direction at a right angle to the mount surface of the circuit board is an up-down direction.

The flat conductor C is in a flexible band shape which extends in the front-back direction (X-axis direction) and of which the width direction is the connector width direction (Y-axis direction) and thickness direction is the up-down direction (Z-axis direction), and as shown in FIG. 2, a front end portion of the flat conductor C is inserted into a housing 10. The flat conductor C is formed such that multiple circuit portions (not shown) extending in the front-back direction are arrayed in the connector width direction. The circuit portions extend, with embedded in an insulating layer of the flat conductor C, in the front-back direction to a position in the vicinity of a front end of the flat conductor C. Moreover, the circuit portions are exposed at a lower surface of the front end portion, and are connectable to the later-described terminals 20 of the connector 1.

As shown in FIG. 1, the front end portion of the flat conductor C is narrower than other portions. Cutouts C1 are formed at both side edges of the front end portion, and back edges of ear portions C2 positioned at the front of the cutouts C1 function as locking target portions C2A to be locked to later-described locking portions 42 of the connector 1 (see FIG. 7B). At front end portions of the other portions of the flat conductor C, shoulder portions C3 are formed on both sides in a width direction of the flat conductor C. As shown in FIG. 2, the shoulder portions C3 are positioned close to later-described back end wall portions 18 of the housing 10 at the back thereof in a state in which the flat conductor C is inserted into the connector 1.

As shown in FIGS. 1 to 3, the connector 1 includes the housing 10 made of an electric insulating material such as resin, the multiple terminals 20 (also see FIG. 4) formed of metal plates, arrayed with the connector width direction as a terminal array direction, and held on the housing 10, the metal fittings 30 formed of metal plates and arranged on both outer sides of a terminal array area in the connector width direction, and the movable member 40 provided turnable between a closed position and an open position and made of an electric insulating material such as resin or metal. The flat conductor C is inserted into and connected to the connector 1 from the back (see an arrow shown in FIG. 1).

As shown in FIGS. 1 and 2, the housing 10 has a substantially rectangular parallelepiped outer shape with the connector width direction as a longitudinal direction, and a receiving space 11 for receiving the flat conductor C is formed as a space opened to the back. The housing 10 has a lower wall 12 and an upper wall 13 which are wall portions extending parallel with the mount surface of the circuit board, two side walls 14 (see FIG. 3) extending in the up-down direction and coupling both end portions of the lower wall 12 in the connector width direction and both end portions of the upper wall 13 in the connector width direction to each other, and a front wall 15 (see FIG. 6B) coupling front ends of the lower wall 12 and the upper wall 13 to each other.

As shown in FIG. 3, the housing 10 has, outside the side walls 14 in the connector width direction, projecting portions 16 projecting from outer surfaces of lower portions of the side walls 14, metal fitting holding portions 17 provided at front half portions of the projecting portions 16, and the back end wall portions 18 provided at back end portions of the projecting portions 16.

Figure 6B:
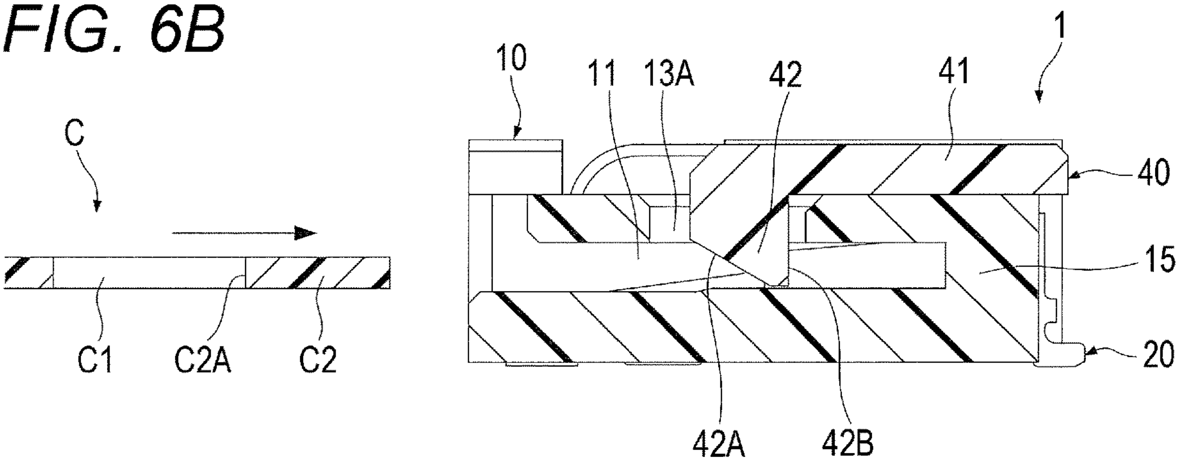
Figure 7A:
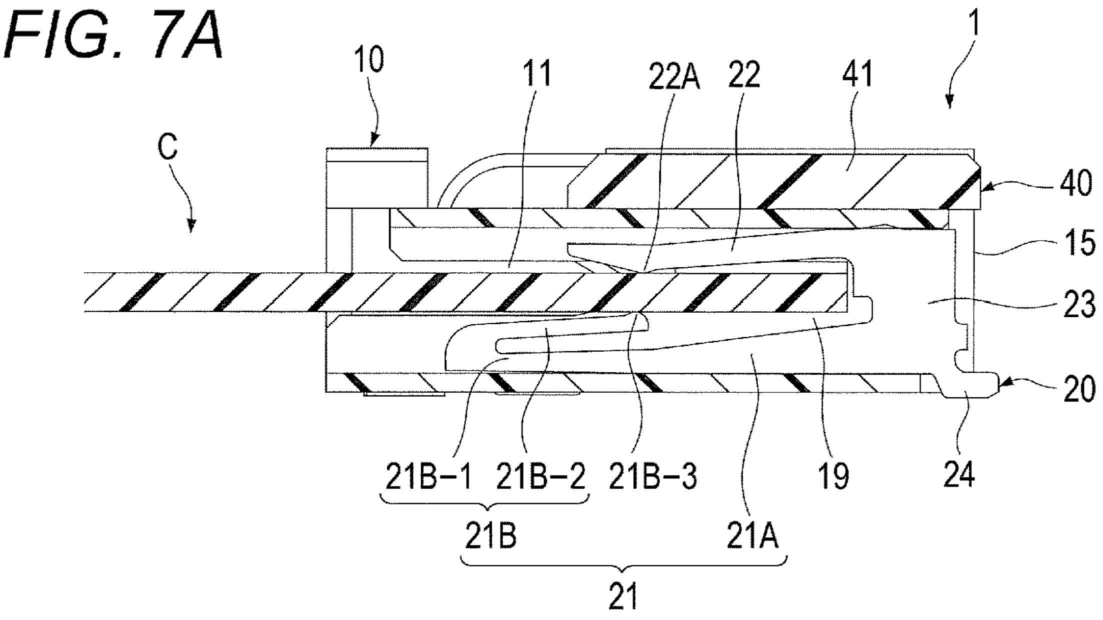
FIGS. 7A to 7C are longitudinal sectional views of the flat conductor electric connector in a state in which insertion of the flat conductor is completed, FIG. 7A showing the section at the position of the terminal, FIG. 7B showing the section at the position of the locking portion of the movable member, and FIG. 7C showing the section at the position of the cam portion of the movable member.
Figure 7B:
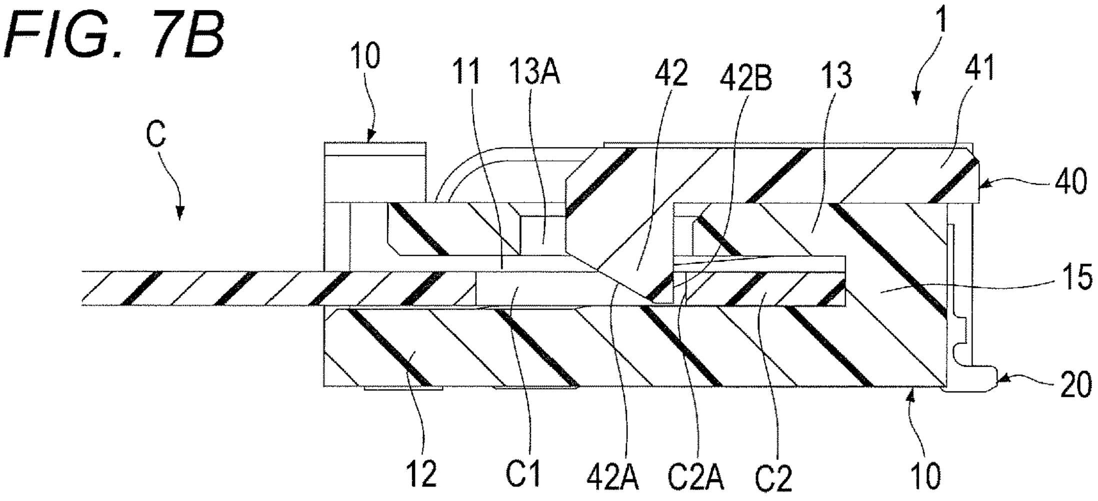

The receiving space 11 is surrounded by the lower wall 12, the upper wall 13, the front wall 15 (see FIG. 6B), and the two side walls 14 (see FIG. 3), extends in the front-back direction, and receives the front end portion of the flat conductor C (see FIGS. 7A and 7B).

At the upper wall 13, upper holes 13A penetrating the upper wall 13 in the up-down direction outside the terminal array area are formed. As shown in FIG. 1, the upper holes 13A allow the later-described locking portions 42 of the movable member 40 to enter the upper holes 13A from above when the movable member 40 is at the closed position (also see FIG. 6B).

Figure 4:
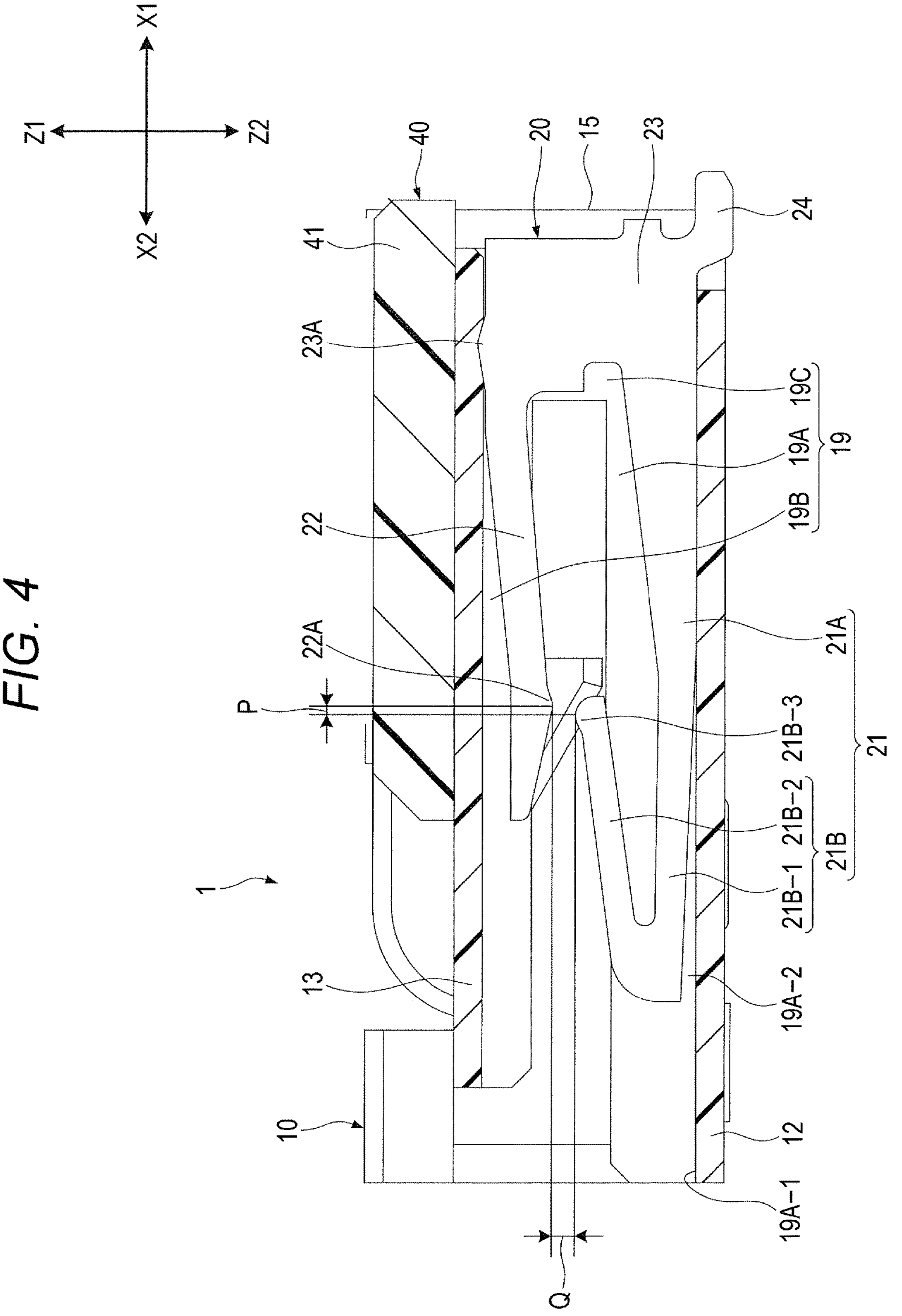
FIG. 4 is a longitudinal sectional view of the flat conductor electric connector, and shows the section at the position of the terminal in a connector width direction.

As shown in FIGS. 1 to 3, in the housing 10, terminal housing portions 19 in which the terminals 20 are housed are formed and arrayed in the connector width direction. FIG. 4 is a longitudinal sectional view of the connector 1 along a plane at a right angle to the connector width direction, and shows the section at the position of the terminal 20 in the connector width direction. As shown in FIG. 4, the terminal housing portion 19 is formed as a groove portion penetrating the housing 10 in the front-back direction. The terminal housing portion 19 has a lower groove portion 19A recessed from an upper surface of the lower wall 12 and extending in the front-back direction, an upper groove portion 19B recessed from a lower surface of the upper wall 13 and extending in the front-back direction, and a front groove portion 19C penetrating the front wall 15 in the front-back direction, extending in the up-down direction, and coupling front end portions of the lower groove portion 19A and the upper groove portion 19B to each other. The terminal housing portion 19 is, as a whole, in a backwards C-shape opened to the back.

As shown in FIG. 3, the projecting portion 16 is in a plate shape having a plate surface at a right angle to the up-down direction, and in the front-back direction, extends across an area over the entirety of the side wall 14. The metal fitting holding portion 17 is provided with a clearance from an outer surface of the side wall 14 in the connector width direction. A space formed between the metal fitting holding portion 17 and the side wall 14 forms a side plate housing portion 10A for housing a later-described side plate portion 43 of the movable member 40.

Figure 5A:
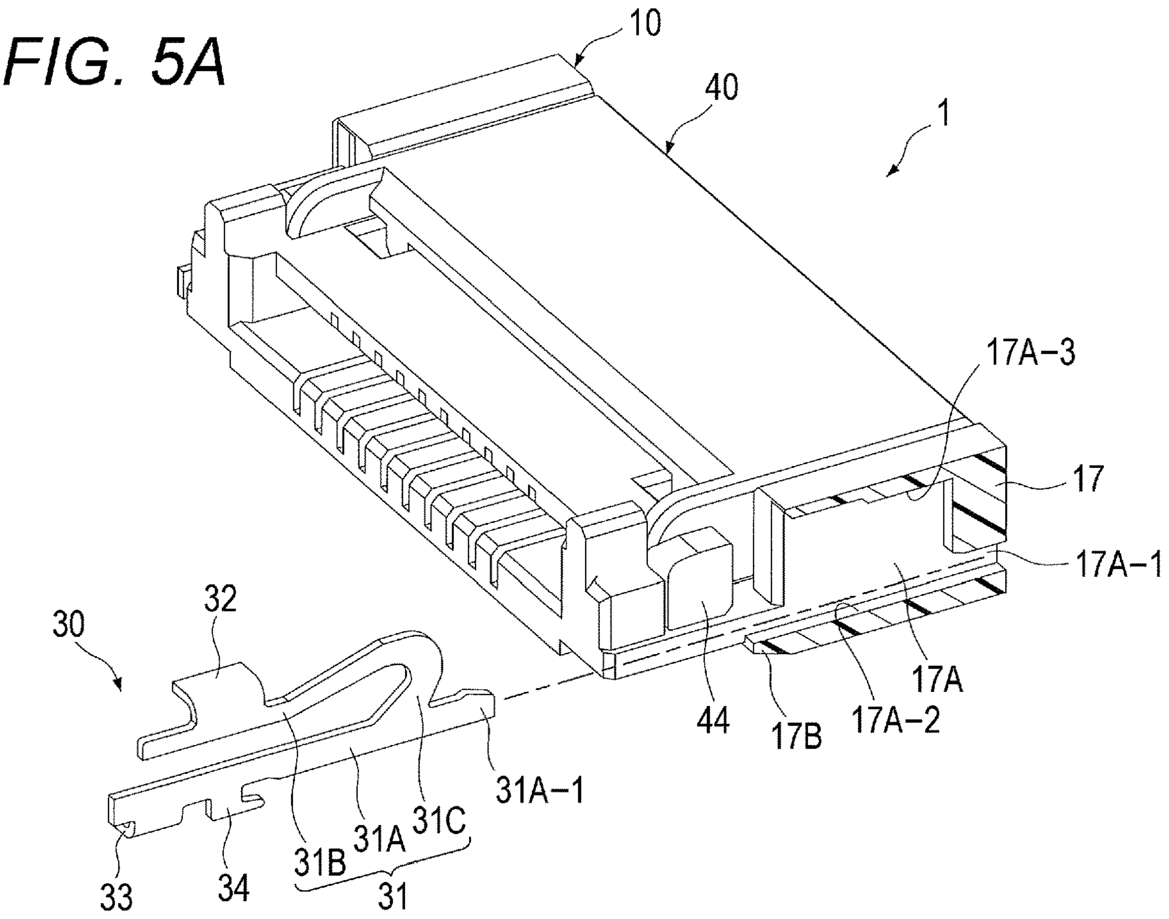
FIGS. 5A and 5B are perspective sectional views of the flat conductor electric connector and show the longitudinal section at the position of the metal fitting in the connector width direction, FIG. 5A showing a state in which one metal fitting is removed and FIG. 5B showing a state in which the metal fitting is attached.
Figure 5B:
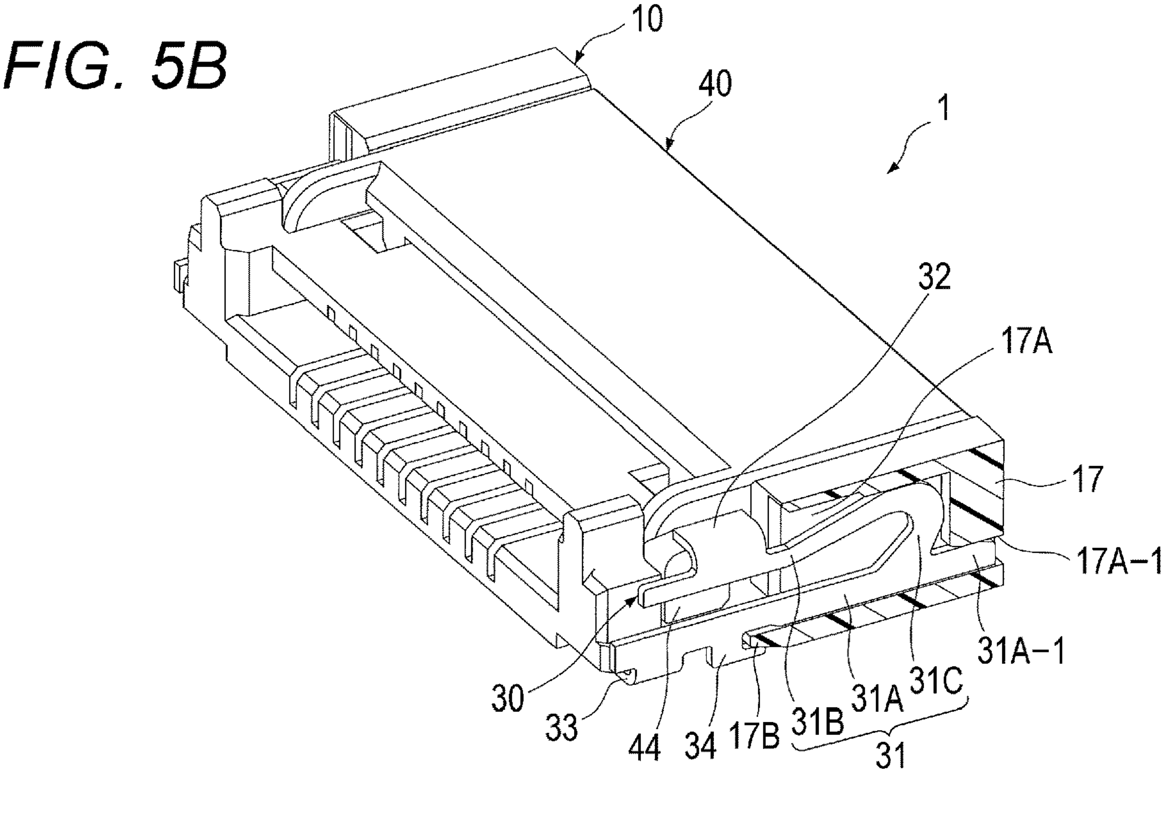

The metal fitting holding portion 17 is in a standing plate shape having a plate surface at a right angle to the connector width direction, and a metal fitting housing portion 17A for housing part of the metal fitting 30 is formed outside the projecting portion 16 in the connector width direction (also see FIGS. 5A and 5B). As shown in FIG. 3, a portion of the metal fitting holding portion 17 positioned inside the metal fitting housing portion 17A in the connector width direction stands upward from the projecting portion 16. A lower portion of the metal fitting holding portion 17 is provided with a locking target end portion 17B which protrudes backward with respect to a back end of the metal fitting housing portion 17A. The locking target end portion 17B is positioned in an area including the metal fitting housing portion 17A in the connector width direction, and is positioned within the area of the projecting portion 16 in the up-down direction and is locked to a later-described locking leg portion 34 of the metal fitting 30 in the up-down direction (see FIG. 5B).

FIGS. 5A and 5B are longitudinal sectional views of the connector 1, and shows the section at the position of the metal fitting 30 in the connector width direction. FIG. 5A shows a state in which one metal fitting 30 is removed, and FIG. 5B shows a state in which the metal fitting 30 is attached. As shown in FIGS. 5A and 5B, the metal fitting housing portion 17A is in a groove shape extending at a right angle to the connector width direction. A lower portion of the metal fitting housing portion 17A extends forward with respect to other portions, and as shown in FIG. 5B, a later-described press-fitting fixing portion 31A-1 of the metal fitting 30 is held in a press-fitting groove portion 17A-1 formed on the front end side of such a lower portion.

As shown in FIG. 3, the back end wall portion 18 is positioned at the back of the metal fitting holding portion 17, stands upward from the projecting portion 16, and is coupled to the outer surface of the side wall 14. A space formed between the metal fitting holding portion 17 and the back end wall portion 18 in the front-back direction forms a cam housing portion 10B for housing a later-described cam portion 44 of the movable member 40.

The terminal 20 is formed by punching of a metal plate member, and in a state in which a plate surface thereof is at a right angle to the connector width direction, is press-fitted and attached from the front to the terminal housing portion 19 of the housing 10. As shown in FIG. 4, the terminal 20 has a lower arm portion 21 which is an arm portion extending in the front-back direction along the lower wall 12 of the housing 10, an upper arm portion 22 which is another arm portion extending in the front-back direction along the upper wall 13 of the housing 10, a coupling arm portion 23 extending in the up-down direction along the front wall 15 and coupling front end portions of the lower arm portion 21 and the upper arm portion 22 to each other, and a connection portion 24 extending forward from a lower portion of the coupling arm portion 23.

The lower arm portion 21 has a support target arm portion 21A housed in the lower groove portion 19A, supported from below by a groove bottom surface 19A-1 forming an inner surface of the lower groove portion 19A, and extending in the front-back direction, and an elastic arm portion 21B extending backward from the support target arm portion 21A. The support target arm portion 21A is entirely housed in the lower groove portion 19A. An upper edge of the support target arm portion 21A is inclined downward as extending backward, and on the other hand, a lower edge of the support target arm portion 21A is not inclined with respect to the front-back direction. That is, the support target arm portion 21A is gradually narrowed toward the back. The lower edge of the support target arm portion 21A is supported on the groove bottom surface 19A-1 across the entire area of the support target arm portion 21A in the front-back direction.

The elastic arm portion 21B has a first elastic portion 21B-1 extending from a back end of the support target arm portion 21A, and a second elastic portion 21B-2 positioned higher than the first elastic portion 21B-1, i.e., on a receiving space 11 side, and bent forward from a back end of the first elastic portion 21B-1. The first elastic portion 21B-1 is entirely housed in the lower groove portion 19A, and is inclined upward as extending backward. That is, a clearance formed between a lower edge of the first elastic portion 21B-1 and the groove bottom surface 19A-1 of the lower groove portion 19A gradually becomes larger toward the back. The first elastic portion 21B-1 is elastically deformable in the up-down direction within the area of this clearance. Hereinafter, this clearance will be referred to as an “elastically-deformable space 19A-2.”

In the present embodiment, the groove bottom surface 19A-1 of the lower groove portion 19A is formed at the same height across the entire area in the front-back direction, and therefore, the elastically-deformable space 19A-2 is formed as the clearance between the first elastic portion 21B-1 and the groove bottom surface 19A-1 because the first elastic portion 21B-1 is inclined. However, the form of the elastically-deformable space 19A-2 is not limited to above. For example, as a modification, in an area corresponding to the first elastic portion 21B-1 in the front-back direction, the groove bottom surface 19A-1 may be formed lower than other areas, and accordingly, the elastically-deformable space 19A-2 may be formed. As another modification, a space below the first elastic portion 21B-1, i.e., a downwardly-opened space, may be formed as the elastically-deformable space 19A-2 without the lower wall 12 formed in the area corresponding to the first elastic portion 21B-1 in the front-back direction. In these modifications, the first elastic portion 21B-1 may be in a shape extending without inclined with respect to the front-back direction.

As shown in FIG. 4, the second elastic portion 21B-2 is partially housed in the lower groove portion 19A, and is inclined upward as extending backward. At a front end of the second elastic portion 21B-2, a lower contact portion 21B-3 which is a contact portion contactable with the circuit portion at the lower surface of the flat conductor C with contact pressure is provided so as to protrude upward. When the second elastic portion 21B-2 is in a free state, the lower contact portion 21B-3 protrudes from the lower groove portion 19A, and is positioned in the receiving space 11. A clearance formed between the second elastic portion 21B-2 and the first elastic portion 21B-1 in the up-down direction gradually becomes larger toward the back, and in the area of this clearance, the second elastic portion 21B-2 is elastically displaceable in the up-down direction.

As shown in FIG. 4, the first elastic portion 21B-1 is formed thicker than the second elastic portion 21B-2. Since the second elastic portion 21B-2 of the elastic arm portion 21B positioned on a free end side is formed thin and the first elastic portion 21B-1 of the elastic arm portion 21B positioned on the side opposite to a free end is formed thick as described above, stress on the elastic arm portion 21B due to contact with the flat conductor C can be dispersed, and therefore, concentration of a load on part of the elastic arm portion 21B can be avoided.

As shown in FIG. 4, the first elastic portion 21B-1 is formed longer than the second elastic portion 21B-2, and a front end of the first elastic portion 21B-1 is positioned at the front with respect to the front end of the second elastic portion 21B-2. Since the first elastic portion 21B-1 thicker than the second elastic portion 21B-2 is formed longer than the second elastic portion 21B-2 in the present embodiment as described above, spring properties can be set to a similar degree between the first elastic portion 21B-1 and the second elastic portion 21B-2, and as a result, a proper pressure of contact with the flat conductor C is easily ensured.

As shown in FIG. 4, the upper arm portion 22 is positioned on the opposite side of the receiving space 11 from the lower arm portion 21 in the up-down direction, i.e., above the lower arm portion 21, and the upper arm portion 22 is inclined downward as extending backward in a state in which part of the upper arm portion 22 is housed in the upper groove portion 19B. At a back end of the upper arm portion 22, an upper contact portion 22A which is another contact portion contactable with an upper surface of the flat conductor C with contact pressure is provided so as to protrude downward. As shown in FIG. 4, when the upper arm portion 22 is in a free state, the upper contact portion 22A protrudes from the upper groove portion 19B, and is positioned in the receiving space 11.

As shown in FIG. 4, a protruding tip of the upper contact portion 22A is positioned at the front with respect to a protruding tip of the lower contact portion 21B-3 of the lower arm portion 21 by a distance P. In order to ensure sufficient contact pressure for the flat conductor C, a clearance having a dimension Q smaller than the half of the thickness dimension R (see FIG. 6A) of the flat conductor C is formed between the protruding tip of the upper contact portion 22A and the protruding tip of the lower contact portion 21B-3 in the up-down direction. Moreover, in the present embodiment, the distance P is set smaller than the thickness dimension R of the flat conductor C and smaller than twice as great as the clearance dimension Q.

Since the distance P is set smaller than the thickness dimension R of the flat conductor C as described above, a state in which the flat conductor C is sandwiched with contact pressure by cooperation of the lower contact portion 21B-3 and the upper contact portion 22A is easily maintained even when the flat conductor C tilts due to external force applied in the thickness direction (up-down direction) of the flat conductor C in a state in which the flat conductor C is connected to the connector 1. As a result, contact between the flat conductor C and each terminal 20 with proper contact pressure can be ensured, and unexpected detachment of the flat conductor C can be avoided.

Because of the clearance dimension Q being set smaller than the half of the thickness dimension R of the flat conductor C, even when the distance P is set smaller than twice as great as the clearance dimension Q, the state in which the flat conductor C is sandwiched with contact pressure by cooperation of the lower contact portion 21B-3 and the upper contact portion 22A is easily maintained. Thus, even when the flat conductor tilts due to the external force applied in the thickness direction (up-down direction) of the flat conductor in a state in which the flat conductor C is connected to the connector, contact between the flat conductor C and each terminal 20 with proper contact pressure can be ensured, and unexpected detachment of the flat conductor C can be avoided.

In the present embodiment, both a condition where the distance P is smaller than the thickness dimension R of the flat conductor C and a condition where the distance P is smaller than twice as great as the clearance dimension Q are satisfied, but both these conditions are not necessarily satisfied, and unexpected detachment of the flat conductor C can be avoided as long as any of these conditions is satisfied.

In the present embodiment, the protruding tip of the upper contact portion 22A is positioned at the front with respect to the protruding tip of the lower contact portion 21B-3 of the lower arm portion 21, but a relative positional relationship between the protruding tips in the front-back direction is not limited to above as long as the distance P between the protruding tips satisfies at least one of the above-described two conditions. That is, the protruding tip of the upper contact portion 22A may be positioned at the back with respect to the protruding tip of the lower contact portion 21B-3 of the lower arm portion 21, or the protruding tips may be at the same position.

The coupling arm portion 23 is housed in the front groove portion 19C. A press-fitting protrusion 23A protruding upward is provided at an upper edge of the coupling arm portion 23, and bites into an inner surface of the upper wall 13 to hold the terminal 20 in the terminal housing portion 19. The connection portion 24 extends outward of the housing 10 from the lower portion of the coupling arm portion 23 to the lower front side. A lower edge of the connection portion 24 is positioned slightly lower than a lower surface of the lower wall 12 of the housing 10, and in a state in which the connector 1 is arranged on the mount surface of the circuit board (not shown), is soldered to a corresponding circuit portion (pad) on the mount surface.

FIGS. 5A and 5B are the perspective sectional views of the connector 1, and show the longitudinal section at the position of the metal fitting 30 in the connector width direction. FIG. 5A shows the state in which the one metal fitting 30 is removed, and FIG. 5B shows the state in which the metal fitting 30 is attached. The metal fitting 30 is formed in such a manner that a metal plate member is punched and partially bent in a plate thickness direction, and is press-fitted in and attached to the metal fitting housing portion 17A of the housing 10 from the back. Since the metal fitting 30 can be press-fitted as described above, the metal fitting 30 can be easily attached to the housing 10.

As shown in FIGS. 5A and 5B, the metal fitting 30 has a body portion 31 having a plate surface at a right angle to the connector width direction, a biasing portion 32 for biasing the cam portion 44 of the movable member 40, a fixing leg portion 33 to be soldered to the mount surface of the circuit board, and the locking leg portion 34 lockable to the housing 10 from below (also see FIG. 3). The body portion 31 having the plate surface at the right angle to the connector width direction forms a large portion of the metal fitting 30, and only the biasing portion 32 and the fixing leg portion 33 are bent in the connector width direction as described later. Thus, the entirety of the metal fitting 30 is compactly formed with a simple shape.

The body portion 31 has a fixing arm portion 31A positioned adjacent to the cam portion 44 of the movable member 40 on the outer side thereof in the connector width direction, extending linearly in the front-back direction, and fixed to the housing 10, a movable arm portion 31B positioned higher than the fixing arm portion 31A and extending in the front-back direction, and a coupling portion 31C extending in the up-down direction and coupling front end portions of the fixing arm portion 31A and the movable arm portion 31B to each other. The press-fitting fixing portion 31A-1 of the metal fitting 30 provided at the front end portion of the fixing arm portion 31A is press-fitted in the press-fitting groove portion 17A-1 of the metal fitting housing portion 17A, and accordingly, the metal fitting 30 is held in the metal fitting housing portion 17A. In a state in which the metal fitting 30 is housed in the metal fitting housing portion 17A, the fixing arm portion 31A of the metal fitting

30 is supported on a lower inner wall surface 17A-2 of the metal fitting housing portion 17A.

The movable arm portion 31B extends in the front-back direction, and is elastically deformable in the up-down direction, i.e., a direction parallel with a plate surface (rolled surface) thereof. A front half portion of the movable arm portion 31B is inclined downward as extending backward, and a back half portion of the movable arm portion 31B linearly extends, without inclination, backward from a back end of the front half portion. Note that the shape of the movable arm portion is not limited to above and the movable arm portion may be, for example, formed such that the front half portion is inclined upward as extending backward and the back half portion linearly extends, without inclination, backward from the back end of the front half portion. The coupling portion 31C is inclined forward, at a position closer to a front end of the fixing arm portion 31A, as extending upward from an upper edge of the fixing arm portion 31A, and couples a portion of the fixing arm portion 31A closer to the front end thereof and a front end portion of the movable arm portion 31B to each other.

The biasing portion 32 is bent, at an intermediate position of the back half portion of the movable arm portion 31B in the front-back direction, at an upper edge of the movable arm portion 31B, and extends inward in the connector width direction, i.e., toward the cam portion 44 of the movable member 40. The biasing portion 32 has a plate surface (rolled surface) at a right angle to the up-down direction, is positioned immediately above the cam portion 44, and restricts upward movement of the cam portion 44 and therefore upward movement of the movable member 40 (see FIGS. 6C, 7C, and 8C).

In the present embodiment, there is nothing above the back half portion of the movable arm portion 31B as shown in FIGS. 1, 2, and 5B, but as a modification, e.g., a restriction portion positioned above a back end portion of the movable arm portion 31B with a predetermined clearance from such a back end portion may be formed by part of the housing 10. In this modification, the back end portion of the movable arm portion 31B contacts the restriction portion from below when displaced upward by a predetermined amount, and further displacement thereof is restricted. With this configuration, excessive upward elastic deformation of the movable arm portion 31B is restricted. Thus, detachment of the cam portion 44 and therefore detachment of the movable member 40 from the housing 10 can be more reliably prevented.

The fixing leg portion 33 is bent, at a position closer to a back end of the fixing arm portion 31A, at a lower edge of the fixing arm portion 31A, and extends inward in the connector width direction. Since the fixing leg portion 33 is formed so as to extend inward in the connector width direction, i.e., extend to the same side as extension of the biasing portion 32, as described above, an increase in the size of the metal fitting 30 in the connector width direction due to the fixing leg portion 33 can be avoided. The fixing leg portion 33 is positioned at the back with respect to the biasing portion 32 in the front-back direction, and extends across the substantially same area as that of the biasing portion 32 in the connector width direction. Moreover, a lower surface of the fixing leg portion 33 is positioned slightly lower than the lower surface of the lower wall 12 of the housing (see FIGS. 6C, 7C, and 8C), and in a state in which the connector 1 is arranged on the mount surface of the circuit board (not shown), the fixing leg portion 33 is soldered and fixed to a corresponding portion (pad) on the mount surface.

The locking leg portion 34 is positioned at the front with respect to the fixing leg portion 33, and is provided within the area of the biasing portion 32 in the front-back direction. The locking leg portion 34 extends forward after having extended downward from a lower edge of the fixing leg portion 33, and the entire shape thereof is in an L-shape. As shown in FIG. 5B, the L-shaped locking leg portion 34 is fitted in the locking target end portion 17B of the metal fitting holding portion 17 from the back, and accordingly, is locked to the locking target end portion 17B from below.

As shown in FIGS. 1 to 3, the movable member 40 has a plate-shaped operation portion 41 extending across an area between the side walls 14 (see FIGS. 2 and 3) in the connector width direction, the locking portions 42 protruding from a plate surface of the operation portion 41, and the side plate portions 43 and the cam portions 44 positioned at both ends of the operation portion 41 in the connector width direction.

The operation portion 41 is operated when the movable member 40 is moved (turned) between the closed position shown in FIG. 1 and the open position shown in FIG. 2. The locking portions 42 are provided at positions corresponding to the locking target portions C2A of the flat conductor C in the connector width direction at a back portion of the operation portion 41 at the closed position (lower portion of the operation portion 41 at the open position). When the movable member 40 is at the closed position, the locking portions 42 protrude from a lower surface of the operation portion 41, and are positioned in the upper holes 13A and receiving space 11 of the housing 10 (see FIG. 6B). Thus, the locking portions 42 are contactable with the flat conductor C (see FIG. 7B). A portion of the locking portion 42 positioned in the receiving space 11 has, at a back surface thereof, a guide surface 42A inclined downward as extending forward, and has, at a front surface thereof, a locking surface 42B locked to the locking target portion C2A of the flat conductor C from the back (see FIGS. 6B and 7B). When the movable member 40 is at the open position, the locking portions 42 are positioned outside the housing 10, and contact with the flat conductor C is cancelled (see FIGS. 8A and 8B).

As shown in FIG. 3, the side plate portion 43 is, at a position at each end of the operation portion 41 in the connector width direction, in a plate shape having a plate surface at a right angle to the connector width direction. The side plate portion 43 extends across an area from an intermediate position of the operation portion 41 to a position at the back with respect to the operation portion 41 in the front-back direction, and protrudes downward. That is, a protruding end portion 43A which is a back end portion of the side plate portion 43 shown in FIG. 3 protrudes backward from a back end of the operation portion 41. The side plate portion 43 is entirely housed in the side plate housing portion 10A of the housing 10 when the movable member 40 is at the closed position (see FIG. 1), and a portion of the side plate portion 43 other than the protruding end portion 43A is positioned outside the side plate housing portion 10A when the movable member 40 is at the open position (see FIG. 2).

The cam portion 44 protrudes in a substantially rectangular columnar shape from an outer surface of the protruding end portion 43A of the side plate portion 43 in the connector width direction, and regardless of the position of the movable member 40, is constantly housed in the cam housing portion 10B of the housing 10. The cam portion 44 is positioned immediately below the biasing portion 32 of the metal fitting 30, and upward movement thereof is restricted by the biasing portion 32. The cam portion 44 is provided at a position including the turning axis of the movable member 40 as viewed in the connector width direction, and is formed such that the sectional shape thereof at a right angle to the turning axis is a substantially rectangular shape.

When the movable member 40 is at the closed position, the cam portion 44 contacts a lower surface of the biasing portion 32 at a first restriction target surface 44A forming a flat upper surface at the closed position (FIGS. 6C and 7C), and as a result, the movable member 40 is reliably maintained at the closed position. When the movable member 40 is at the open position, the cam portion 44 contacts the lower surface of the biasing portion 32 at a second restriction target surface 44B forming a flat upper surface at the open position (see FIG. 8C), and as a result, the movable member 40 is reliably maintained at the open position.

In the present embodiment, in a state in which the cam portion 44 contacts the lower surface of the biasing portion 32 at the closed position or the open position, the movable arm portion 31B of the metal fitting 30 is not elastically deformed, i.e., biasing force from the biasing portion 32 does not act on the cam portion 44. However, as a modification, at least at one of the closed position or the open position, in a state in which the movable arm portion 31B of the metal fitting 30 is slightly elastically deformed, the biasing portion 32 may contact the cam portion 44 such that moderate biasing force from the biasing portion 32 acts on the cam portion 44. As another modification, at least at one of the closed position or the open position, a clearance may be formed in the up-down direction between the cam portion 44 and the biasing portion 32.

A cam surface 44C is formed between the first restriction target surface 44A and the second restriction target surface 44B at an outer peripheral surface (outer peripheral surface parallel with the connector width direction) of the cam portion 44. The cam surface 44C is a protruding curved surface formed at one corner portion of the cam portion 44. In the present embodiment, in a course of the movable member 40 turning between the closed position and the open position, the cam portion 44 presses the biasing portion 32 upward by the cam surface 44C, and accordingly, elastically displaces the movable arm portion 31B. Then, the cam portion 44 receives reactive force, i.e., downward biasing force, from the biasing portion 32.

The connector 1 configured as described above is assembled in the following manner. First, the terminals 20 are press-fitted in and attached to the terminal housing portions 19 of the housing 10 from the front. Moreover, the movable member 40 held in the posture at the closed position is attached to the housing 10 from above. At this point, the side plate portions 43 of the movable member 40 are housed in the side plate housing portions 10A, and the cam portions 44 are housed in the cam housing portions 10B. Next, the metal fittings 30 are press-fitted in and attached to the metal fitting housing portions 17A of the housing 10 from the back. At this point, the locking leg portions 34 are fitted in the locking target end portions 17B, and are locked to the locking target end portions 17B from below. Moreover, the biasing portions 32 of the metal fittings 30 are positioned immediately above the cam portions 44, and accordingly, upward movement of the cam portions 44 is restricted. The connector 1 is completed in such a manner that the terminals 20, the metal fittings 30, and the movable member 40 are attached to the housing 10 as described above.

Note that in the present embodiment, the terminals 20, the movable member 40, and the metal fittings 30 are attached to the housing 10 in this order, but a step of attaching the terminals 20 may be performed after a step of attaching the metal fittings 30 and the movable member 40 or may be performed simultaneously. In the present embodiment, the movable member 40 in the posture at the closed position is attached to the housing 10, but the posture of the movable member 40 upon attachment thereof is not limited to above and may be, e.g., the posture at the open position.

Next, an operation of inserting the flat conductor C into the connector 1 or removing the flat conductor C from the connector 1 will be described.

First, the connection portions 24 of the terminals 20 of the connector 1 are soldered to the corresponding circuit portions of the circuit board (not shown), and the fixing leg portions 33 of the metal fittings 30 are soldered to the corresponding portions of the circuit board. By such soldering of the connection portions 24 and the fixing leg portions 33, the connector 1 is attached to the circuit board.

Figure 6A:
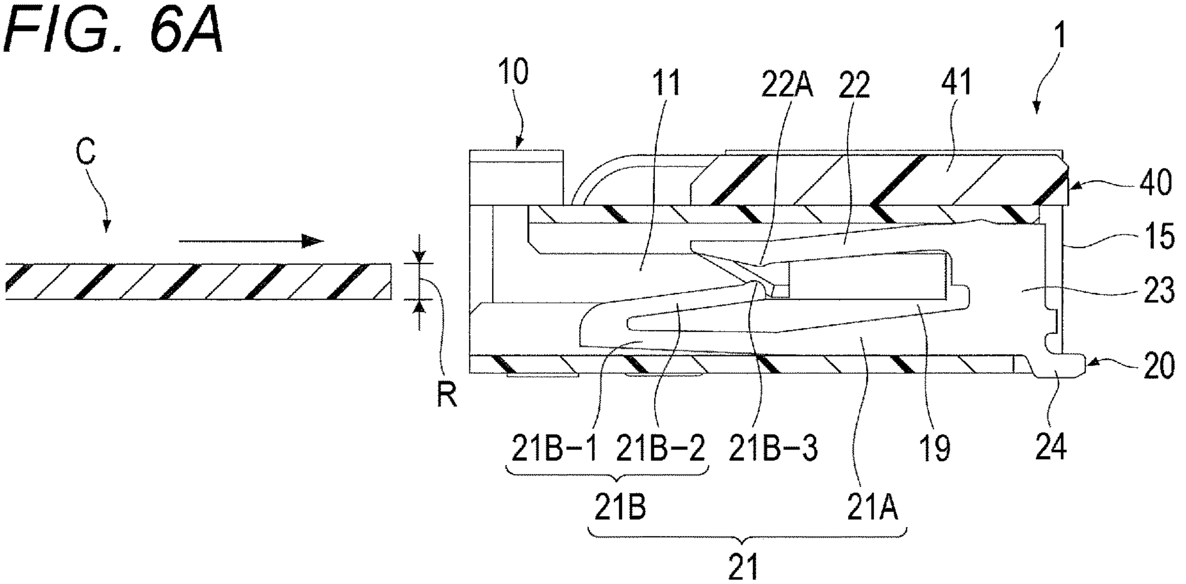
FIGS. 6A to 6C are longitudinal sectional views of the flat conductor electric connector in a state immediately before the flat conductor is inserted, FIG. 6A showing the section at the position of the terminal, FIG. 6B showing the section at the position of a locking portion of the movable member, and FIG. 6C showing the section at the position of a cam portion of the movable member.
Figure 6C:
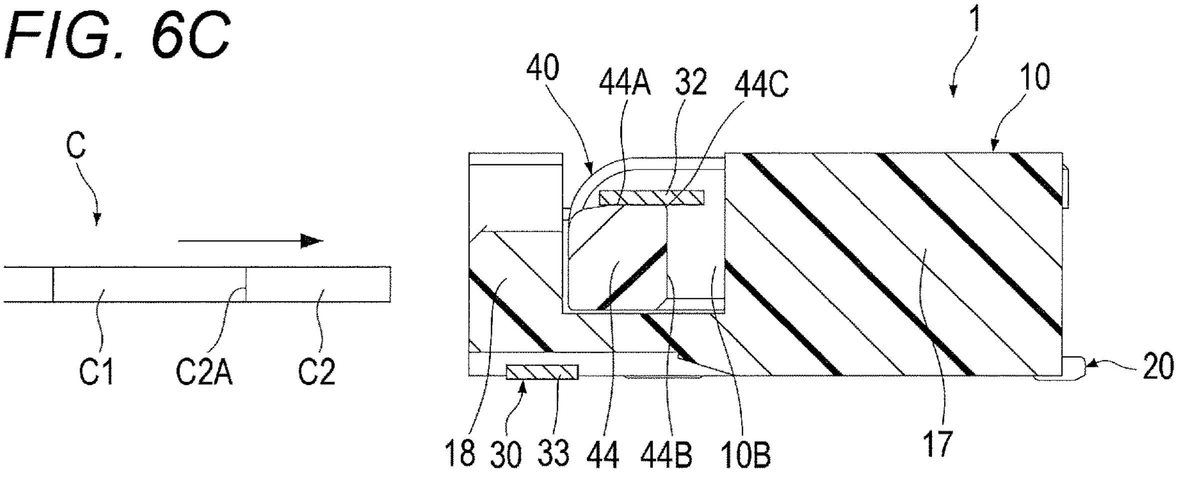

Next, as shown in FIGS. 6A to 6C, at the back of the connector 1 in a state in which the movable member 40 is at the closed position, the flat conductor C is positioned so as to extend in the front-back direction (X-axis direction) along the mount surface of the circuit board (not shown) (also see FIG. 1). Next, the flat conductor C is inserted forward (X1 direction) into the receiving space 11 of the connector 1.

In the present embodiment, the second elastic portion 21B-2 of the terminal 20 having the lower contact portion 21B-3 is bent at the back end of the first elastic portion 21B-1, and extends forward. Thus, when the flat conductor C is inserted into the receiving space 11 from back, the flat conductor C is smoothly guided forward by back end portions of the elastic arm portions 21B, i.e., bent portions of the elastic arm portions 21B curved in a backwardly-raised shape, and reaches the position of the lower contact portions 21B-3. Thus, at any portion, the terminal 20 is not buckled due to contact with the front end of the flat conductor C. As a result, the terminals 20 and the flat conductor C can properly contact each other.

In a course of the flat conductor C being inserted into the receiving space 11, the front end of the flat conductor C contacts the lower contact portions 21B-3 of the second elastic portions 21B-2 of the terminals 20 and the upper contact portions 22A of the upper arm portions 22 of the terminals 20. Then, the front end of the flat conductor C pushes down the second elastic portions 21B-2 to elastically displace the second elastic portions 21B-2 downward, and pushes up the upper arm portions 22 to elastically displace the upper arm portions 22 upward. As a result, a portion between the lower contact portions 21B-3 and the upper contact portions 22A is expanded. At this point, the first elastic portions 21B-1 are also elastically displaced downward in response to elastic displacement of the second elastic portions 21B-2.

At the position of each locking portion 42 of the movable member 40 in the connector width direction, the front end of the flat conductor C contacts the guide surface 42A of the locking portion 42 to push up the locking portion 42. Since the locking portions 42 are pushed up, the entirety of the movable member 40 is moved upward. Accordingly, the biasing portions 32 of the metal fittings 30 are pushed up by the cam portions 44, and the movable arm portions 31B of the metal fittings 30 are elastically displaced upward. That is, elastic displacement of the movable arm portions 31B allows upward movement of the locking portions 42.

Figure 7C:
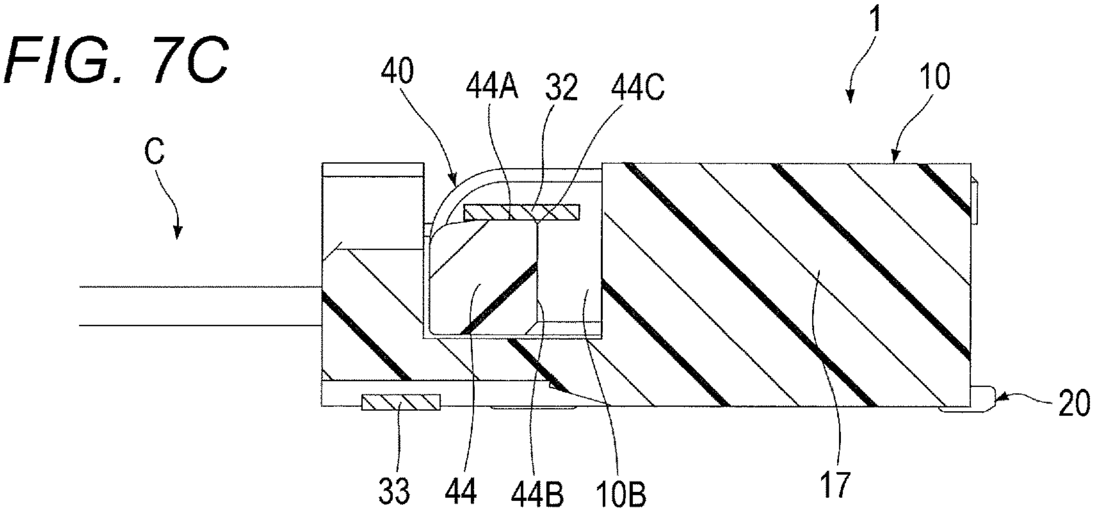

Since the portion between the lower contact portions 21B-3 and the upper contact portions 22A of the terminals 20 is expanded and the locking portions 42 of the movable member 40 are moved upward as described above, the flat conductor C can be inserted further forward. As shown in FIGS. 7A to 7C, the flat conductor C is inserted until contacting the front wall 15 (see FIGS. 7A and 7B) of the housing 10. At this point, the shoulder portions C3 of the flat conductor C are positioned close to the back end wall portions 18 of the housing 10 at the back thereof, as shown in FIG. 2.

In a state in which insertion of the flat conductor C is completed, the elastically-displaced state of the elastic arm portions 21B (first elastic portions 21B-1 and second elastic portions 21B-2) of the lower arm portions 21 and the upper arm portions 22 is maintained as shown in FIG. 7A, and the flat conductor C is sandwiched by the lower contact portions 21B-3 and the upper contact portions 22A. That is, the upper contact portions 22A press the flat conductor C from above while the lower contact portions 21B-3 contact the circuit portions of the flat conductor C with contact pressure. In this manner, the electrical conduction state of the terminals 20 and the flat conductor C is maintained.

In a course of inserting the flat conductor C, when the locking portions 42 reach the position of the cutouts C1 after the ear portions C2 of the flat conductor C have passed through the position of the locking portions 42, the movable member 40 returns to the closed position, and the locking portions 42 enter the cutouts C1 from above as shown in FIG. 7B. As a result, the locking surfaces 42B of the locking portions 42 are positioned lockable to the locking target portions C2A of the flat conductor C from the back, and accordingly, unexpected detachment of the flat conductor C is prevented. As shown in FIG. 7C, the lower surface (rolled surface) of the biasing portion 32 of the metal fitting 30 contacts the first restriction target surface 44A of the cam portion 44 of the movable member 40, and the movable member 40 is maintained at the closed position. In this manner, an operation of connecting the flat conductor C to the connector 1 is completed.

Figure 8A:
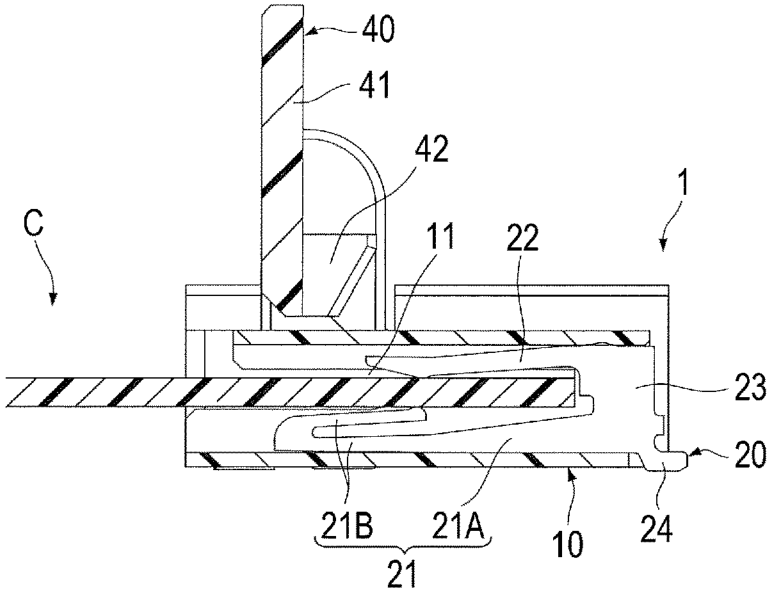
FIGS. 8A to 8C are longitudinal sectional views of the flat conductor electric connector in a state immediately before the flat conductor is removed, FIG. 8A showing the section at the position of the terminal, FIG. 8B showing the section at the position of the locking portion of the movable member, and FIG. 8C showing the section at the position of the cam portion of the movable member.
Figure 8B:
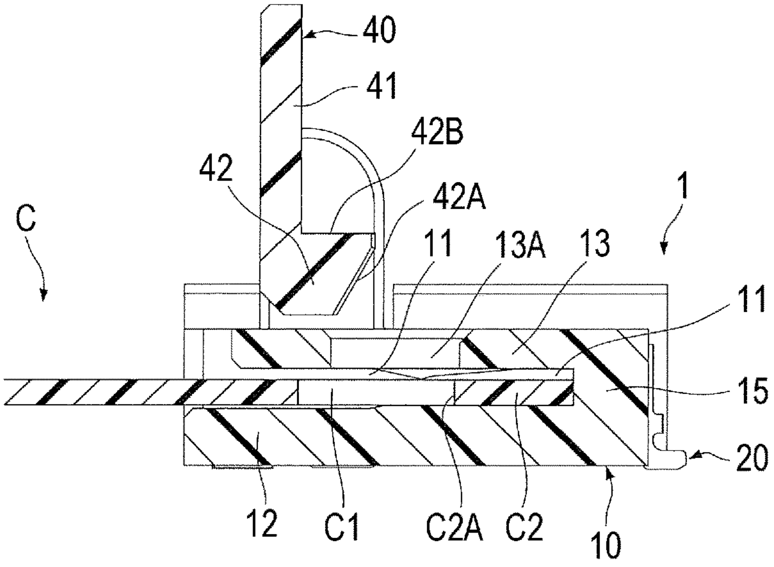
Figure 8C:
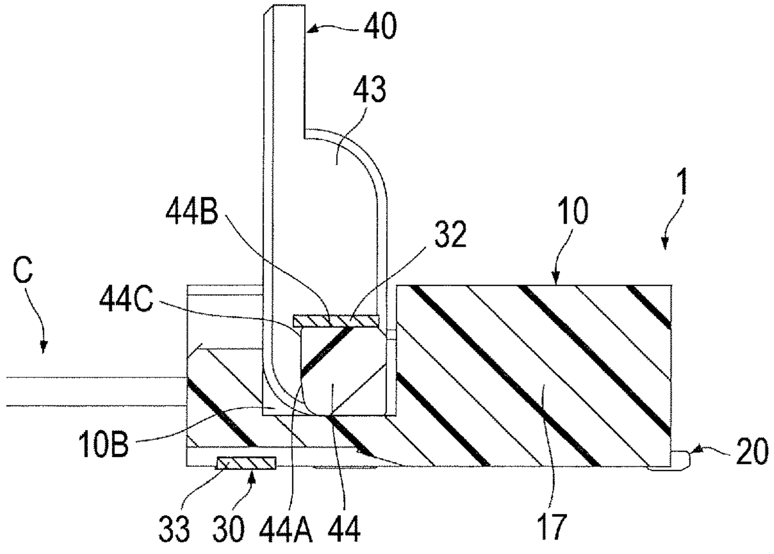

In the state shown in FIGS. 7A to 7C, i.e., when the flat conductor C connected to the connector 1 is purposefully removed from the connector 1, the movable member 40 at the closed position is turned to the open position shown in FIGS. 8A to 8C. In a course of the movable member 40 turning to the open position, the cam surfaces 44C of the cam portions 44 press the biasing portions 32 of the metal fittings 30 upward while slidably contacting the lower surfaces of the biasing portions 32. When the biasing portions 32 are pressed, the movable arm portions 31B of the metal fittings 30 are elastically displaced upward, and accordingly, the biasing portions 32 are displaced upward. That is, the cam portions 44 are allowed to be further turned while receiving the biasing force from the biasing portions 32.

In the present embodiment, the biasing portion 32 biases the cam portion 44 at the plate surface (rolled surface) thereof. Thus, as compared to a case where a plate-thickness surface (fracture surface) of the biasing portion biases the cam portion, the biasing portion 32 can contact the cam portion 44 at a smoother surface, and the area of contact between the biasing portion 32 and the cam portion 44 can be increased. As a result, even if the biasing portion 32 and the cam portion 44 repeatedly slidably contact each other due to movement of the movable member 40, abrasion of the cam portion 44 is less likely to be caused, and lowering of the biasing force of the biasing portion 32 can be favorably avoided.

When the movable member 40 reaches the open position, the second restriction target surface 44B of the cam portion 44 forms the upper surface, and the movable arm portion 31B of the metal fitting 30 is no longer elastically displaced and returns to a free state, as shown in FIG. 8C. As a result, the lower surface of the biasing portion 32 contacts the second restriction target surface 44B of the cam portion 44, and the movable member 40 is maintained at the open position. Since the movable member 40 is maintained at the open position as described above, unexpected movement of the movable member 40 to the closed position can be avoided.

As a result of movement of the movable member 40 to the open position, the locking portion 42 of the movable member 40 is separated upward from the cutout C1 of the flat conductor C as shown in FIG. 8B, and the flat conductor C is allowed to be removed. Moreover, this state is maintained by contact between the lower surface of the biasing portion 32 and the second restriction target surface 44B of the cam portion 44 as shown in FIG. 8C. The flat conductor C is pulled backward (X2 direction), and in this manner, the flat conductor C is removed from the connector 1 without difficulty and the removal operation is completed.

In the present embodiment, the fixing leg portion 33 is provided at the metal fitting 30 and is soldered to the mount surface of the circuit board, and therefore, when the biasing portion 32 receives upward force from the cam portion 44 of the movable member 40 in a course of turning the movable member 40, the soldered portion of the fixing leg portion 33 can provide resistance against the upward force, and as a result, detachment of the metal fitting 30 from the housing can be avoided.

In the present embodiment, the locking leg portion 34 is provided at the metal fitting 30, and therefore, detachment of the metal fitting 30 from the housing 10 can be avoided when the biasing portion 32 receives the upward force from the cam portion 44 of the movable member 40 because the locking leg portion 34 is locked to the locking target end portion 17B of the housing 10 from below. Specifically, the fixing leg portion 33 is soldered to the mount surface of the circuit board yet before the connector 1 is mounted on the circuit board, and therefore, the soldered portion of the fixing leg portion 33 cannot provide resistance against the upward force. Thus, a technique of providing the locking leg portion 34 to provide resistance against the upward force by locking force between the locking leg portion 34 and the locking target end portion 17B is extremely effective before connector mounting.

In the present embodiment, the circuit portions of the flat conductor C are exposed at the lower surface of the flat conductor C. Instead, the circuit portions may be exposed at the upper surface of the flat conductor C. In this case, the upper arm portion 22 of the terminal 20 contacts the circuit portion at the upper contact portion 22A. Alternatively, the circuit portions may be exposed at both the lower and upper surfaces of the flat conductor C. In this case, the lower contact portion 21B-3 contacts the lower circuit portion, and the upper contact portion 22A contacts the upper circuit portion.

In the present embodiment, the biasing portion 32 of the metal fitting 30 biases the cam portion 44 of the movable member 40, but the movable member portion to be biased is not necessarily the cam portion and may be other portions of the movable member.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A flat conductor electric connector to which a flat conductor extending in a front-back direction is connected, comprising:

a housing formed with a receiving space which is opened to a back such that the flat conductor is inserted forward into the housing; and multiple terminals arrayed and held on the housing in a state in which plate surfaces of the terminals are at a right angle to a terminal array direction which is a direction at a right angle to both the front-back direction and a thickness direction of the flat conductor, wherein each terminal has an arm portion extending in the front-back direction, the arm portion has a support target arm portion supported on an inner surface of a wall portion and extending in the front-back direction, and an elastic arm portion extending backward from the support target arm portion, the elastic arm portion has a first elastic portion extending from a back end of the support target arm portion and elastically displaceable in the thickness direction of the flat conductor without the support target arm portion supported on the wall portion, and a second elastic portion positioned on a receiving space side with respect to the first elastic portion, bent forward from a back end of the first elastic portion, and elastically displaceable in the thickness direction of the flat conductor, and the second elastic portion has a contact portion contactable with the flat conductor with contact pressure.

2. The flat conductor electric connector according to claim 1, wherein the first elastic portion is formed thicker and longer than the second elastic portion as viewed in the terminal array direction, and a front end of the first elastic portion is positioned at a front with respect to a front end of the second elastic portion.

3. The flat conductor electric connector according to claim 1, wherein each terminal has another arm portion positioned on an opposite side of the receiving space from the arm portion and extending in the front-back direction, the other arm portion has another contact portion contacting the flat conductor with contact pressure to sandwich the flat conductor in cooperation with the contact portion, and a distance between the contact portion and the other contact portion in the front-back direction is smaller than a thickness dimension of the flat conductor.

4. The flat conductor electric connector according to claim 1, wherein each terminal has another arm portion positioned on an opposite side of the receiving space from the arm portion and extending in the front-back direction, the other arm portion has another contact portion contacting the flat conductor with contact pressure to sandwich the flat conductor in cooperation with the contact portion, and a distance between the contact portion and the other contact portion in the front-back direction is smaller than twice as great as a clearance dimension between the contact portion and the other contact portion in the thickness direction of the flat conductor.

* * * * *